(12) United States Patent
Mantena et al.

(10) Patent No.: US 7,386,474 B2
(45) Date of Patent: *Jun. 10, 2008

(54) METHOD, SYSTEM AND PROGRAM PRODUCT FOR PROVIDING AN ENTITLED PRICE IN AN ELECTRONIC TRANSACTION

(75) Inventors: Ravindra R. Mantena, Morrisville, NC (US); Christina L. Mattoon, Danbury, CT (US); Bijay Satpathy, Danbury, CT (US); Julie A. Wheeler-Cyran, New Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 513 days.

This patent is subject to a terminal disclaimer.

(21) Appl. No.: 09/752,330

(22) Filed: Dec. 29, 2000

(65) Prior Publication Data

US 2002/0087421 A1 Jul. 4, 2002

(51) Int. Cl.
*G06Q 30/00* (2006.01)
(52) U.S. Cl. .................................................... 705/26
(58) Field of Classification Search ................ 705/26, 705/27
See application file for complete search history.

(56) References Cited

U.S. PATENT DOCUMENTS

| | | | |
|---|---|---|---|
| 6,286,028 B1 | 9/2001 | Cohen et al. ............... 709/202 |
| 6,338,050 B1* | 1/2002 | Conklin et al. .............. 705/80 |
| 6,381,640 B1* | 4/2002 | Beck et al. ................. 709/223 |
| 6,415,156 B1 | 7/2002 | Stadelmann ................ 455/466 |
| 6,889,197 B2* | 5/2005 | Lidow ......................... 705/10 |
| 2002/0161670 A1* | 10/2002 | Walker et al. ................ 705/26 |

FOREIGN PATENT DOCUMENTS

WO WO98/10382 * 3/1998

OTHER PUBLICATIONS

"Supplier Bar Codes: Closing The EDI Loop," Joseph R. Carter and Gary L. Ragatz, The National Association of Purchasing Management, Inc., 1991.*
"Multiplatform pursuits," Roberto Muchel, Manufacturing Systems, Wheaton, Nov. 1998, vol. 16, Issue 11, p. 44.*
No Author, "Microsoft Computer Dictionary". Microsoft Press, Third Edition, 1997, p. 308.*
Kurose et al. "Computer Networking: A Top-Down Approach Featuring the Internet", Addison Wesley, Second Edition, pp. 41-47.*
Dilger, Karen Abramic "Business conduct is on the line" Manufacturing Systems, v17n4, Aprl. 1999. Retrieved from Dialog File: 15, Acc#: 01820368.*

* cited by examiner

*Primary Examiner*—Naeem Haq
(74) *Attorney, Agent, or Firm*—Derek S. Jennings; Wayne F. Reinke, Esq.; Heslin Rothenberg Farley & Mesiti P.C.

(57) ABSTRACT

An entitled price in an electronic transaction is provided to a public electronic environment (e.g., a browser on a global computer network) from a private electronic environment (e.g., an ERP application on a private computer network) by electronically sending from a requestor a request for an entitled price via a public electronic environment; automatically routing the request to a private electronic environment; obtaining the entitled price within the private electronic environment while the requestor waits; and automatically returning the entitled price from the private electronic environment to the public electronic environment for providing to the requestor.

48 Claims, 1 Drawing Sheet

METHOD, SYSTEM AND PROGRAM PRODUCT FOR PROVIDING AN ENTITLED PRICE IN AN ELECTRONIC TRANSACTION

CROSS-REFERENCE TO RELATED APPLICATIONS

This application contains subject matter which is related to the bubject matter of the following applications, each of which is assigned to the same assignee as this application and field on the same day as this application. Each of the below listed applications is hereby incorperated herein by refernce in its entirety:

patent application Ser. No. 09/752,331, filed Dec. 29, 2000, by Mantena et al., entitled "Method, System and Program Product for Providing an Estimated Date of Delivery in an Electronic Transactions," now abandoned;

patent application Ser. No. 09/751,078, filed Dec. 29, 2000, by Mantena et al., entitled "Method, System and Program Product for Providing an Electronic Order Confirmation in an Electronic Transaction"; and patent application Ser. No. 09/751,069, filed Dec. 29, 2000, by Mantena et al., entitled "Method, System and Program Product for Synchronous Communication Between a Public Electronic Environment and a Private Electronic Environment".

BACKGROUND OF THE INVENTION

1. Technical Field

The present invention generally relates to obtaining an entitled price in an electronic transaction. More particularly, the present invention relates to obtaining an entitled price in a public electronic environment from a private electronic environment.

2. Background Information

Electronic transactions involving the purchase of various goods and services have steadily increased with the popularity and use of public electronic environments, such as, for example, global computer networks (e.g., the INTERNET). Among the biggest participants in such electronic transactions are large businesses that typically make volume purchases. These types of companies tend to negotiate price discounts with one or more sellers of goods they need. Such negotiated prices are referred to herein as the "entitled price," which is the price a buyer is entitled to for a given item based on an entitlement, such as, for example, a contract with the seller or a promotional offer from the seller (e.g., a coupon) or a program with a business partner of the seller (e.g., "point" programs similar to airline mileage programs).

Due to the number of and differences among the various entitlements for various customers of a given seller, the calculation of an entitled price is no trivial matter for many sellers. In the past, sellers have been unable to provide an entitled price in response to a price inquiry from a potential buyer in an electronic purchasing environment while the potential buyer waits, for example, an inquiry to a commerce site on a global computer network. The information needed to calculate the entitled price, as well as things such as taxes and shipping costs, typically resides in a private electronic environment, such as, for example, a secure computer or computer network housing an Enterprise Resource Planning (ERP) application. ERP applications are large, expensive and complex computer programs that track massive volumes of data (e.g., base prices, customers, contracts, price rules, tax conditions, etc.), and calculate, among other things, an entitled price. Due to the sensitive nature of such information, both for the buyer and the seller, ERP applications have not been made accessible from public electronic environments for security reasons.

It has been suggested that commerce sites simply develop their own pricing engines to provide an entitled price. However, since the key data resides with the ERP application, such pricing engines require that the data be kept current in more than one location. Such a situation could result in a price provided to the buyer that does not equal the price ultimately charged, for example, if a base price update has not yet been made for the pricing engine. Worse, some commerce sites will actually go offline to calculate the entitled price and send it back to buyer, making it appear to the buyer to be automatically generated. This practice, known as "rip and read" can also lead to inaccuracies, due to time constraints and human error. Such confusion causes various problems for the buyer, not the least of which is budgeting, and serves only to reduce the credibility of the seller.

Thus, a need exists for a way to automatically provide an accurate entitled price in an electronic transaction.

SUMMARY OF THE INVENTION

Briefly, the present invention satisfies the need for a way to automatically provide an accurate entitled price in an electronic transaction by providing a secure communication link between a public electronic environment and a private electronic environment for requesting, obtaining and returning the same.

In accordance with the above, it is an object of the present invention to provide a real-time entitled price in an electronic transaction.

The present invention provides, in a first aspect, a method of providing an entitled price in an electronic transaction. The method comprises electronically sending by a requester a request for an entitled price from a public electronic environment, automatically routing the request to a private electronic environment, obtaining the entitled price within the private electronic environment while the requester waits, and automatically returning the entitled price from the private electronic environment to the public electronic environment for providing to the requestor.

The present invention also provides a system and program product in second and third aspects, respectively, implementing the method of the first aspect of the invention.

These, and other objects, features and advantages of this invention will become apparent from the following detailed description of the various aspects of the invention taken in conjunction with the accompanying drawings.

DETAILED DESCRIPTION OF THE INVENTION

Figure 1:
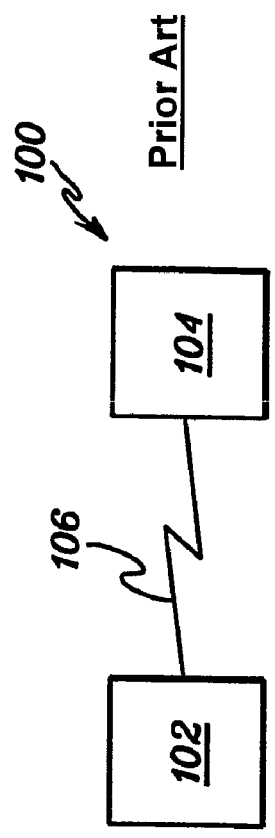
FIG. 1 is a simplified block diagram of a computing environment useful with the present invention.

One example of a computing environment useful with the present invention is described with reference to FIG. 1. A computing environment 100 includes, for instance, at least one computing unit 102 coupled to at least one other computing unit 104. In one example, computing unit 102 is a buyer's computer, while computing unit 104 is a server for an electronic merchant. Each unit includes, for example, one or more central processing units, memory, one or more storage devices and one or more input/output devices, as is well known in the art.

Computing unit 104 is, for example, an IBM system running AIX, a Unix derivative Operating System, and computing unit 102 is, for instance, a personal computer, such as a personal computer with Microsoft WINDOWS as the operating system, and based on the Intel PC architecture.

Computing unit 102 is coupled to computing unit 104 via a standard connection 106, such as any type of wire connection, token ring or network connection, to name just a few examples. One example of a communications protocol used by one or more of these connections is TCP/IP which allows connection to a computer network, such as, for example, a local area network or a global computer network (e.g., the INTERNET).

The INTERNET comprises a vast number of computers and computer networks that are interconnected through communication links. The interconnected computers exchange information using various services, such as electronic mail, and the World Wide Web ("WWW"). The WWW service allows a server computer system (i.e., Web server or Web site) to send graphical Web pages of information to a remote client computer system. The remote client computer system can then display the Web pages. Each resource (e.g., computer or Web page) of the WWW is uniquely identifiable by a Uniform Resource Locator ("URL"). To view a specific Web page, a user's computer system specifies the URL for that Web page in a request (e.g., a HyperText Transfer Protocol ("HTTP") request). The request can be, for example, directly input or performed through a hyperlink (or just "link") which is text or graphics that when pointed to and selected creates the request. The request is forwarded to the Web server that supports that Web page. When that Web server receives the request, it sends that Web page to the user's computer system. When the user's computer system receives that Web page, it typically displays the Web page using a browser. A browser is a special-purpose application program that effects the requesting of Web pages and the displaying of Web pages. A user's computer system may use a browser such as, for example, Microsoft INTERNET EXPLORER or Netscape NAVIGATOR.

Web pages are typically defined using HyperText Markup Language ("HTML"). HTML provides a standard set of tags that define how a Web page is to be displayed. When a user indicates to the browser to display a Web page, the browser sends a request to the server computer system to transfer to the user's computer system an HTML document that defines the Web page. When the requested HTML document is received by the user's computer system, the browser displays the Web page as defined by the HTML document. The HTML document contains various tags that control the displaying of text, graphics, controls, and other features. The HTML document may additionally contain URLs of other Web pages available on that server computer system or other server computer systems.

Figure 2:
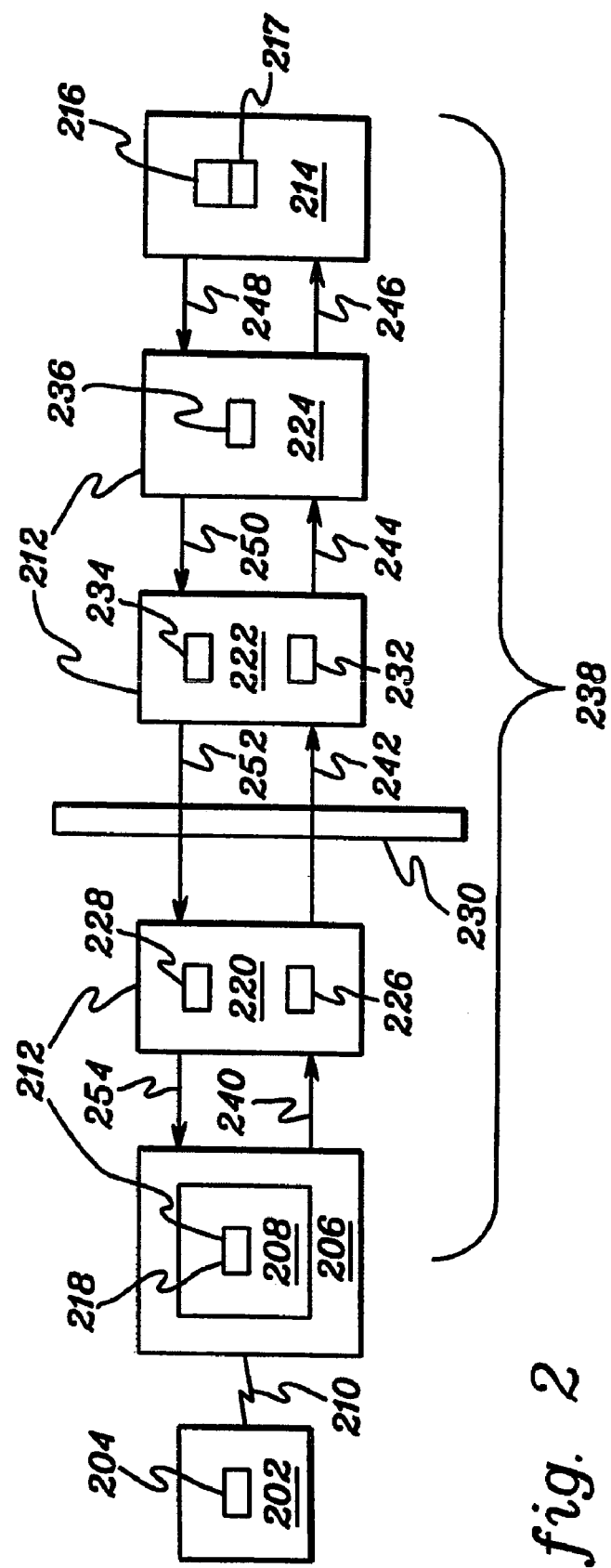
FIG. 2 is a block diagram of a system for providing an entitled price in an electronic transaction.

FIG. 2 is a block diagram of one example of a system 200 for providing an entitled price in an electronic transaction to a public electronic environment, e.g., a front end application on a global computer network, from a private electronic environment, e.g., a back end ERP application on a private computer network. System 200 comprises computing unit 202 housing a browser 204 coupled to a server 206 for a commerce site 208 via a global computer network 210. System 200 further comprises messaging middleware 212 for communication between server 206 and computing unit 214 housing back end ERP application 216. The ERP application includes a database 217 of entitled price information, among other information.

Messaging middleware 212 could be, for example, MSMQ from Microsoft in Redmond, Wash. However, the messaging middleware is preferably MQSERIES from IBM in Armonk, N.Y., since it runs on multiple different operating systems (e.g., MVS, VM, AIX, UNIX, Windows and more), whereas MSMQ runs only on the Microsoft Windows operating system. Further, the ERP application could be, for example, BAAN from the BAAN Company in The Netherlands, however, the ERP application is preferably SAP from SAP AG in Germany. Most preferably, the combination of MQSERIES and SAP is used.

The messaging middleware in this example is broken up into several components, including first messaging client 218, first messaging server 220, second messaging server 222 and second messaging client 224. First messaging client 218 is actually part of the programming for commerce site 208, and initiates communications from browser 204 to the messaging middleware. First messaging server 220 is a computing unit, and comprises a transmission queue 226 for outgoing communications with second messaging server 222 (also a computing unit), and a local queue 228 for incoming communications from second messaging server 222.

A firewall 230 separates the messaging servers. As one skilled in the art will know, a firewall physically comprises equipment and/or software for monitoring all incoming communications to messaging server 222 (and, in some scenarios, outgoing communications as well) for messages coming from predefined addresses (e.g., Internet Protocol (IP) addresses), and only allows messages from those addresses through. In addition, a firewall can monitor the type of incoming message (e.g., a request for a particular type of information). Second messaging server 222 comprises a holding queue 232 for holding incoming communications from messaging server 220, and a reply queue 234 for outgoing messages to messaging server 220. Second messaging client 224 comprises module 236 for issuing a calculation command to ERP application 216. In one scenario, the second messaging client is a separate computing unit, however, it could instead be part of the same computing unit, for example, messaging server 222 or even computing unit 214.

It will be understood that the calculation of the entitled price is not part of the present invention. The invention simply requires the result, however, the way the result is produced is not relevant. In actual implementation, it is the ERP application that calculates the entitled price in any number of different ways, and that is how this example will describe the obtaining of the entitled price.

In the present example, the messaging middleware (except, technically, for messaging client 218), firewall and ERP application all reside on a private computer network 238 (e.g., a local area network) while browser 204 and server 206 are part of global computer network 210, which is a public computer network. Server 206 can be considered to sit on both networks, connected to browser 204 through the global computer network, and to the other elements of private network 238 via messaging client 218. One example of a communications protocol on private network 238 is TCP/IP.

One example of providing an entitled price to a user employing browser 204 from ERP application 216 will now be described. In this example, the user initiates the communication by sending a request for an entitled price via browser 204 to commerce site 208 via global computer network 210. Assume that while browsing the items available at site 208, the user requests an entitled price of a particular item. This could be done, for example, by selecting (using, e.g., a pointing device) a graphical button on the site near a graphic of the item. Assume also that the buyer is an employee buying for his employer, a large company having a contract with the merchant of the commerce site. The contract calls for a discount on the base price for the particular item of 15%.

In some manner, it will be necessary for the employee to be identified as a potential buyer for the company. This could be done, for example, by the employee providing this identifying information, for instance, along with the entitled price request. Such identifying information could, for example, take the form of the employee's name, which could be kept in the ERP application and associated with the company or a particular contract. As another example, the identifying information could take the form of simply the name of the employer. As still another example, a small identifying program known as a "cookie" could be stored on computing unit 202 that would automatically provide the identifying information. However, in any case, if the employer has multiple contracts and/or the employee is a buyer on multiple contracts, then additional clarifying information will be needed, for example, a contract number.

After initiating the request, the browser (and employee) then waits for the entitled price to be returned from ERP application 216 by commerce site 208. Upon receipt of the request by site 208 via server 206, messaging client 218 connects to messaging server 220 over standard connection 240. A connection is made, for example, via an application program interface (API), with messaging client 218 being preprogrammed with an address for messaging server 220. Once the connection is established, the messaging client then sends the request to the messaging server along with an identification of second messaging server 222 and, preferably, a unique token identifier to track the message path. The connection between messaging client 218 and messaging server 220 remains open, awaiting a reply. Also, preferably, the identification for second messaging server 222 is not the real address thereof, but something that can be correlated by first messaging server 220 into a real address. This masking of the real address is for security, since global computer network server 206 is exposed to a public computer network. Once the request along with any other necessary information, collectively "the request" and the token identifier are received by messaging server 220, they are placed in transmission queue 226. Typically, the date of the request will also be provided, enabling the ERP application to check against any applicable entitlement contract dates. The transmission queue is not intended to hold a request for any length of time, but simply acts as a temporary staging queue.

Once placed in transmission queue 226, the request and the token identifier are immediately transmitted over an open channel 242 across firewall 230 to messaging server 222. Once received by messaging server 222, the request and the token identifier are placed in holding queue 232. Open channel 242 is actually a standard connection monitored and controlled by channel software residing on messaging server 222.

When the request and the token identifier are placed in holding queue 232, module 236 is, in some fashion, woken up. In one example, second messaging client 224 constantly monitors holding queue 232, and once something is placed therein, immediately retrieves the same. In any case, the request and token identifier are passed from messaging server 222 to messaging client 224 via standard connection 244. Depending on the messaging middleware used, module 236 may need to reformat the information being passed to match a format required by the particular ERP application being used. The function of module 236 is, however, to issue a command to ERP application 216 over standard connection 246 to calculate the entitled price. After issuing the command to the ERP application, messaging client 224, like the elements back to browser 204, waits for a reply to the request from the ERP application.

In response to the command, ERP application 216 receives the request, the token identifier and the employee identifying information, accesses database 217 and calculates an entitled price based thereon. The ERP application accesses database 217 to determine what the requestor is entitled to, in terms of a discount. In a simple example, the contract number corresponds to a discount percentage, which is retrieved from the database. The ERP application also looks up the list price for the item indicated in the request, and applies the discount percentage to the list price to determine the entitled price. The ERP application may also calculate any taxes that would be applied to the purchase, based on tax tables stored and regularly updated in its database. Preferably, a quantity of the item is included in the request, in which case the ERP application would multiply the entitled price by the quantity, as well as the total amount of taxes, if applicable.

After the ERP application calculates the entitled price, it returns the entitled price and the token identifier to messaging client 224 over standard connection 248. Upon receipt of the entitled price, messaging client 224 immediately transfers the entitled price and token identifier to messaging server 222 over standard connection 250. Messaging server 222, upon receipt of the information, immediately places it in reply queue 234. Reply queue 234 points to messaging server 220 and, since there is an open channel 252 between the messaging servers, the entitled price is immediately transferred from reply queue 234 to messaging server 220. Open channel 252 is, like open channel 242, a standard connection monitored and controlled by software residing on messaging server 220, and once something is placed in entitled price queue 234, it immediately transfers the contents thereof to messaging server 220. Messaging server 220 then places the entitled price and the token identifier in local queue 228. Once messaging client 218 detects that something has been placed in local queue 228, it retrieves the entitled price and token identifier over standard connection 254, and confirms that the token identifier received matches the one that was originally sent. At this point, commerce site 208 returns the entitled price to browser 204 for display thereby over global computer network 210.

Although system 200 was described with two messaging server/client pairs, it will be understood that more or less such pairs could be used, and that a given pair need not be on separate computing units. For example, there could be another messaging server/client pair within computing unit 214. Additional messaging server/client pairs provide increased security, which could further be enhanced with additional firewalls. Further, it will be understood that the connection pairs between elements on private computer network 238 could each actually be a single, standard two-way connection.

Security for system 200 is also preferably enhanced through the use of encryption at various stages. For example, communications between computing unit 202 and server 206 are preferably encrypted. One example of such encryption is 128-bit SSL (secure socket layer) encryption, which is routinely used on global computer networks. In such a case, for example, requests from computing unit 202 to server 206 are encrypted by browser 204, and decrypted by commerce site 208. Further, as the request is received by messaging server 220 over connection 240, it is again encrypted. Examples of encryption algorithms that could be used include, for instance, DES and TRIPLE-DES available in various commercially available products from International Business Machines Corporation in Armonk, N.Y. Messaging server 222 then decrypts the request via channel 242 upon receipt. When the entitled price is coming back from ERP application 216, it is encrypted as it leaves messaging server 222 and decrypted as it leaves messaging server 220. In this case, since connection 254 is not a channel, the decryption is actually done by messaging server 220. It will be understood that the above encryption scheme is merely one example of numerous encryption schemes that could be used.

The above-described computing environment and/or computing units are only offered as examples. The present invention can be incorporated and used with many types of computing units, computers, processors, nodes, systems, work stations and/or environments without departing from the spirit of the present invention. Additionally, while some of the embodiments described herein are discussed in relation to servers and clients, such embodiments are only examples. Other types of computing environments can benefit from the present invention and, thus, are considered a part of the present invention.

Additionally, in various aspects of the present invention, the client need not be remote from the server. Various aspects of the invention are equally applicable to clients and servers running on the same physical machine, different physical machines or any combinations thereof.

The present invention can include at least one program storage device readable by a machine, tangibly embodying at least one program of instructions executable by the machine to perform the capabilities of the present invention. The program storage device can be provided separately, or as a part of a computer system.

The figures depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. A method of providing an entitled price in an electronic transaction, comprising:
electronically sending by a requestor a request for an entitled price based on a preexisting entitlement from a public electronic environment;
automatically routing the request to a private electronic environment;
obtaining the entitled price within the private electronic environment in real time while the requestor waits; and
automatically returning the entitled price from the private electronic environment to the public electronic environment for providing to the requestor.

2. The method of claim 1, wherein the public electronic environment comprises a front end application, wherein the private electronic environment comprises a back end Enterprise Resource Planning (ERP) application, wherein the electronically sending comprises electronically sending by the requestor the request via the front end application, wherein the automatically routing comprises automatically routing the request to the ERP application, wherein the obtaining comprises obtaining the entitled price from the ERP application while the requestor waits, and wherein the automatically returning comprises automatically returning the entitled price from the ERP application to the front end application for providing to the requestor.

3. The method of claim 2, wherein the automatically routing and the automatically returning are accomplished at least in part by messaging middleware.

4. The method of claim 3, wherein the messaging middleware comprises MQSERIES and the ERP application comprises SAP.

5. The method of claim 3, wherein the messaging middleware comprises MQSERIES.

6. The method of claim 3, wherein the messaging middleware comprises MSMQ.

7. The method of claim 2, wherein the ERP application comprises SAP.

8. The method of claim 2, wherein the ERP application comprises BAAN.

9. The method of claim 2, wherein the public electronic environment comprises a global computer network, and wherein the front end application comprises a browser.

10. The method of claim 9, wherein the electronic transaction takes place at least partially over the global computer network, wherein the electronically sending comprises electronically sending the request from the browser to a global computer network site server, and wherein the automatically routing comprises:
forwarding the request from the global computer network site server to messaging middleware;
sending the request from the messaging middleware to the ERP application; and
causing by the messaging middleware a command to be issued to the ERP application.

11. The method of claim 10, wherein the automatically returning comprises:
sending the entitled price from the ERP application to the messaging middleware;
forwarding the entitled price from the messaging middleware to the global computer network site server; and
returning the entitled price from the global computer network site server to the browser.

12. The method of claim 11, further comprising encrypting and decrypting communications between the browser and the global computer network site server, and between the global computer network site server and the messaging middleware.

13. A system for providing an entitled price in an electronic transaction, comprising:
means for electronically sending by a requestor a request for an entitled price based on a preexisting entitlement from a public electronic environment;
means for automatically routing the request to a private electronic environment;

means for obtaining the entitled price within the private electronic environment in real time while the requestor waits; and means for automatically returning the entitled price from the private electronic environment to the public electronic environment for providing to the requestor.

14. The system of claim 13, wherein the public electronic environment comprises a front end application, wherein the private electronic environment comprises a back end Enterprise Resource Planning (ERP) application, wherein the means for electronically sending comprises means for electronically sending by the requestor the request via the front end application, wherein the means for automatically routing comprises means for automatically routing the request to the ERP application, wherein the means for obtaining comprises means for obtaining the entitled price from the ERP application while the requestor waits, and wherein the means for automatically returning comprises means for automatically returning the entitled price from the ERP application to the front end application for providing to the requestor.

15. The system of claim 14, wherein the means for automatically routing and the means for automatically returning comprise messaging middleware.

16. The system of claim 15, wherein the messaging middleware comprises MQSERIES and the ERP application comprises SAP.

17. The system of claim 15, wherein the messaging middleware comprises MQSERIES.

18. The system of claim 15, wherein the messaging middleware comprises MSMQ.

19. The system of claim 14, wherein the ERP application comprises SAP.

20. The system of claim 14, wherein the ERP application comprises BAAN.

21. The system of claim 14, wherein the public electronic environment comprises a global computer network, and wherein the front end application comprises a browser.

22. The system of claim 21, wherein the electronic transaction takes place at least partially over the global computer network, wherein the means for electronically sending comprises means for electronically sending the request from the browser to a global computer network site server, and wherein the means for automatically routing comprises:

means for forwarding the request from the global computer network site server to messaging middleware;
means for sending the request from the messaging middleware to the ERP application; and
means for causing by the messaging middleware a command to be issued to the ERP application.

23. The system of claim 22, wherein the means for automatically returning comprises:

means for sending the entitled price from the ERP application to the messaging middleware;
means for forwarding the entitled price from the messaging middleware to the global computer network site server; and
means for returning the entitled price from the global computer network site server to the browser.

24. The system of claim 23, further comprising:

means for encrypting and decrypting communications between the browser and the global computer network site server; and
means for encrypting and decrypting communications between the global computer network site server and the messaging middleware.

25. At least one program storage device readable by a machine, tangibly embodying at least one program of instructions executable by the machine to perform a method of providing an entitled price in an electronic transaction, comprising:

electronically sending by a requestor a request for an entitled price based on a preexisting entitlement from a public electronic environment;
automatically routing the request to a private electronic environment;
obtaining the entitled price within the private electronic environment in real time while the requestor waits; and
automatically returning the entitled price from the private electronic environment to the public electronic environment for providing to the requestor.

26. The at least one program storage device of claim 25, wherein the public electronic environment comprises a front end application, wherein the private electronic environment comprises a back end Enterprise Resource Planning (ERP) application, wherein the electronically sending comprises electronically sending by the requestor the request via the front end application, wherein the automatically routing comprises automatically routing the request to the ERP application, wherein the obtaining comprises obtaining the entitled price from the ERP application while the requestor waits, and wherein the automatically returning comprises automatically returning the entitled price from the ERP application to the front end application for providing to the requestor.

27. The at least one program storage device of claim 25, wherein the automatically routing and the automatically returning are accomplished at least in part by messaging middleware.

28. The at least one program storage device of claim 27, wherein the messaging middleware comprises MQSERIES and the ERP application comprises SAP.

29. The at least one program storage device of claim 27, wherein the messaging middleware comprises MQSERIES.

30. The at least one program storage device of claim 27, wherein the messaging middleware comprises MSMQ.

31. The at least one program storage device of claim 25, wherein the ERP application comprises SAP.

32. The at least one program storage device of claim 25, wherein the ERP application comprises BAAN.

33. The at least one program storage device of claim 25, wherein the public electronic environment comprises a global computer network, and wherein the front end application comprises a browser.

34. The at least one program storage device of claim 33, wherein the electronic transaction takes place at least partially over the global computer network, wherein the electronically sending comprises electronically sending the request from the browser to a global computer network site server, and wherein the automatically routing comprises:

forwarding the request from the global computer network site server to messaging middleware;
sending the request from the messaging middleware to the ERP application; and
causing by the messaging middleware a command to be issued to the ERP application.

35. The at least one program storage device of claim 34, wherein the automatically returning comprises:

sending the entitled price from the ERP application to the messaging middleware;
forwarding the entitled price from the messaging middleware to the global computer network site server; and returning the entitled price from the global computer network site server to the browser.

36. The at least one program storage device of claim 35, further comprising encrypting and decrypting communications between the browser and the global computer network site server, and between the global computer network site server and the messaging middleware.

37. A method for providing a computing infrastructure, comprising integrating computer-readable code into a computing system, wherein the computer-readable code in combination with the computing system is capable of performing:

electronically sending by a requestor a request for an entitled price based on a preexisting entitlement from a public electronic environment;

automatically routing the request to a private electronic environment;

obtaining the entitled price within the private electronic environment in real time while the requestor waits; and automatically returning the entitled price from the private electronic environment to the public electronic environment for providing to the requestor.

38. The method of claim 37, wherein the public electronic environment comprises a front end application, wherein the private electronic environment comprises a back end Enterprise Resource Planning (ERP) application, wherein the electronically sending comprises electronically sending by the requestor the request via the front end application, wherein the automatically routing comprises automatically routing the request to the ERP application, wherein the obtaining comprises obtaining the entitled price from the ERP application while the requestor waits, and wherein the automatically returning comprises automatically returning the entitled price from the ERP application to the front end application for providing to the requestor.

39. The method of claim 38, wherein the automatically routing and the automatically returning are accomplished at least in part by messaging middleware.

40. The method of claim 39, wherein the messaging middleware comprises MQSERIES and the ERP application comprises SAP.

41. The method of claim 39, wherein the messaging middleware comprises MQSERIES.

42. The method of claim 39, wherein the messaging middleware comprises MSMQ.

43. The method of claim 38, wherein the ERP application comprises SAP.

44. The method of claim 38, wherein the ERP application comprises BAAN.

45. The method of claim 38, wherein the public electronic environment comprises a global computer network, and wherein the front end application comprises a browser.

46. The method of claim 45, wherein the electronic transaction takes place at least partially over the global computer network, wherein the electronically sending comprises electronically sending the request from the browser to a global computer network site server, and wherein the automatically routing comprises:

forwarding the request from the global computer network site server to messaging middleware;

sending the request from the messaging middleware to the ERP application; and causing by the messaging middleware a command to be issued to the ERP application.

47. The method of claim 46, wherein the automatically returning comprises:

sending the entitled price from the ERP application to the messaging middleware;

forwarding the entitled price from the messaging middleware to the global computer network site server; and returning the entitled price from the global computer network site server to the browser.

48. The method of claim 47, further comprising encrypting and decrypting communications between the browser and the global computer network site server, and between the global computer network site server and the messaging middleware.

\* \* \* \* \*